United States Patent [19]
Giese et al.

[11] 3,761,127
[45] Sept. 25, 1973

[54] SAFETY SEAT WITH A SAFETY BELT, IN PARTICULAR FOR MOTOR VEHICLES

[75] Inventors: Ralf Giese, Koln-Mauenheim; Paul Korner, Koln; Axel Rauthmann, Dansweiler, all of Germany

[73] Assignee: Ford Motor Company, Dearborn, Mich.

[22] Filed: Apr. 6, 1972

[21] Appl. No.: 241,591

[30] Foreign Application Priority Data
July 1, 1971  Germany.................. P 21 32 709.3

[52] U.S. Cl.............. 297/389, 297/346, 297/216, 296/65 R, 248/394
[51] Int. Cl. ...................... B60n 1/02, A62b 35/00
[58] Field of Search.............. 297/340, 216, 346, 297/379, 385, 389; 180/110–113; 296/65 R; 248/394–396

[56] References Cited
UNITED STATES PATENTS

| | | | |
|---|---|---|---|
| 3,471,197 | 10/1969 | Ely.................................. | 297/216 X |
| 3,552,707 | 1/1971 | Tanaka............................. | 248/396 |
| 3,583,665 | 6/1971 | Lohr................................. | 297/346 |
| 3,638,999 | 2/1972 | Tischler........................... | 297/389 |

Primary Examiner—Casmir A. Nunberg
Attorney—Keith L. Zerschling et al.

[57] ABSTRACT

A safety seat with a safety belt, in particular for motor vehicles, with a seat and backrest frame, the backrest frame being adjustable in rake about a pivot axis and being supported on the seat frame through adjustable diagonal braces, the terminal points of a three-point safety belt being attached to the seat and backrest frame.

11 Claims, 4 Drawing Figures

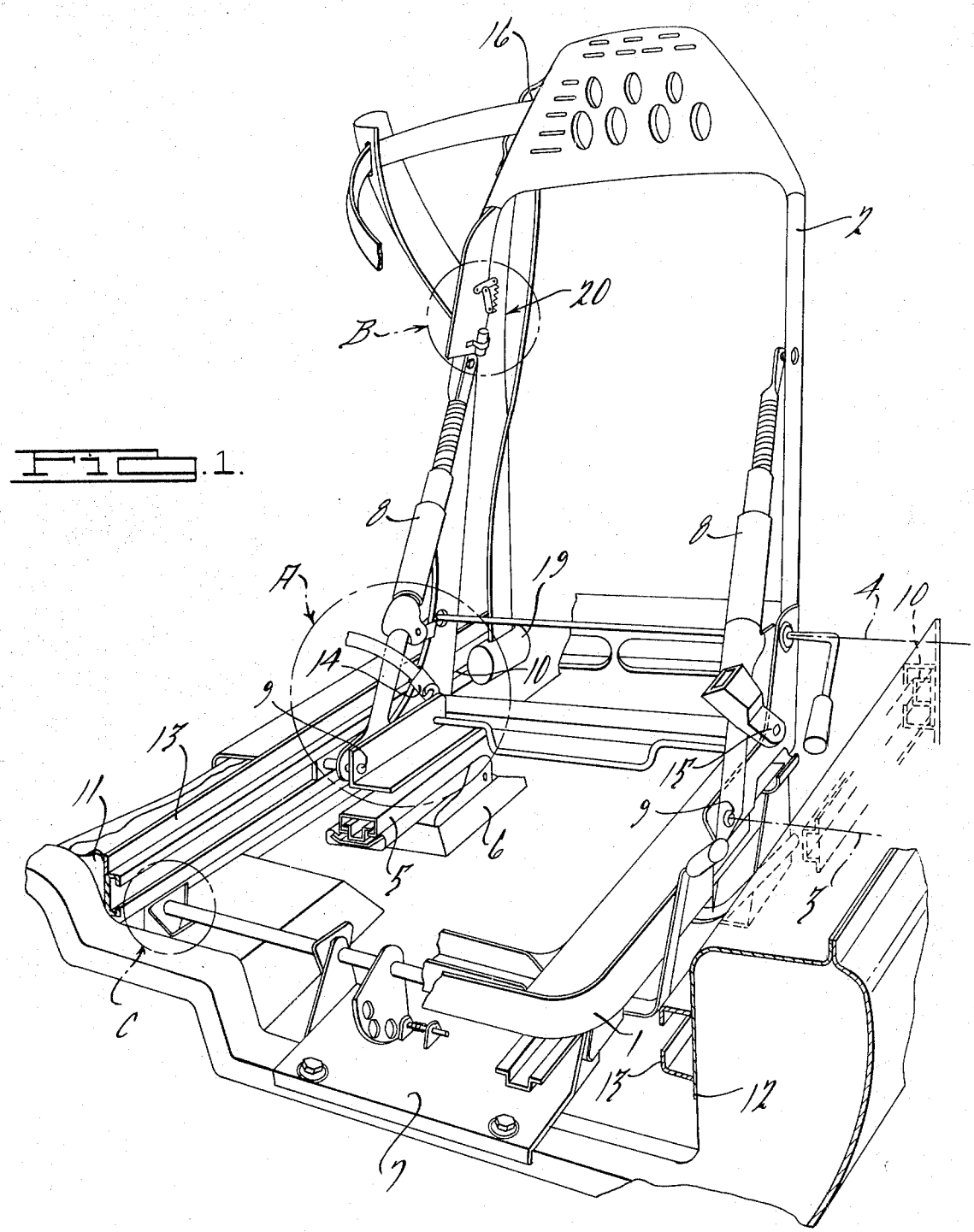

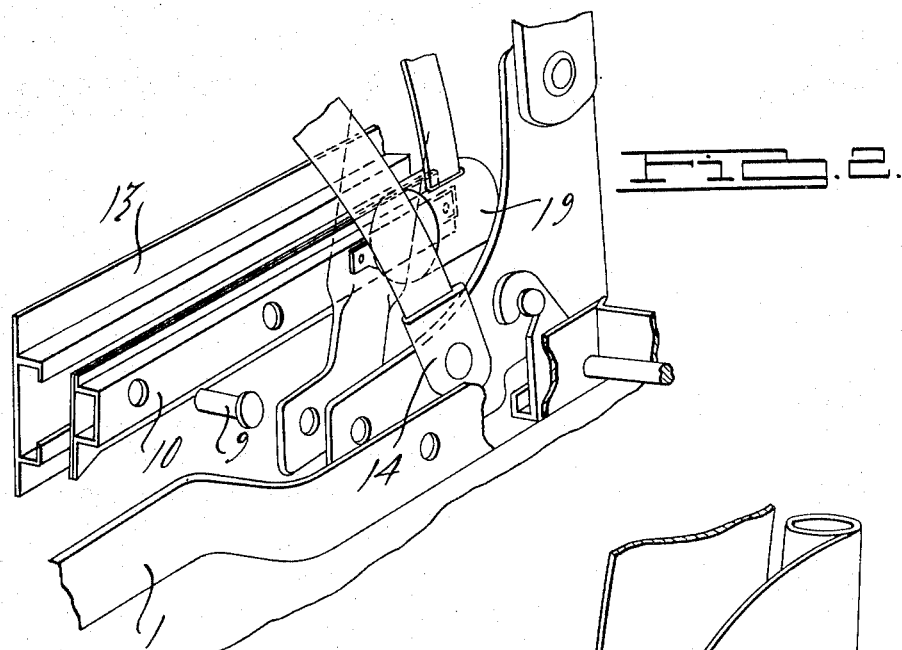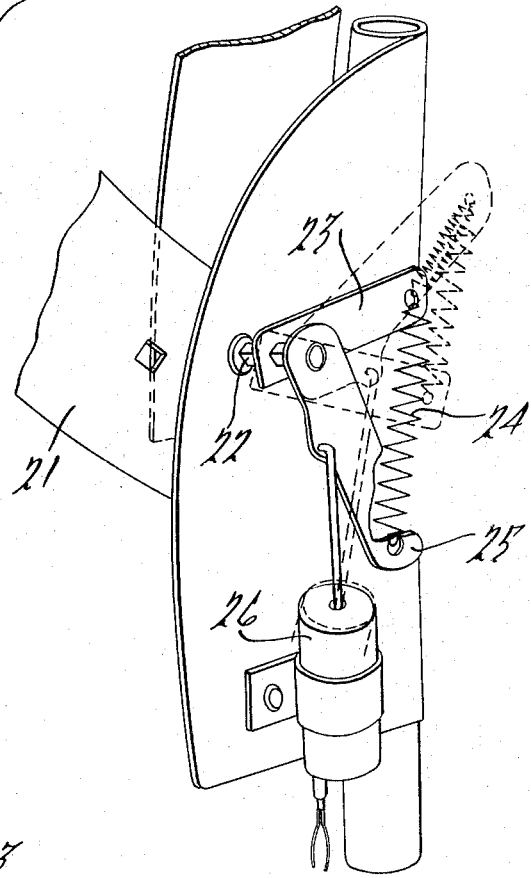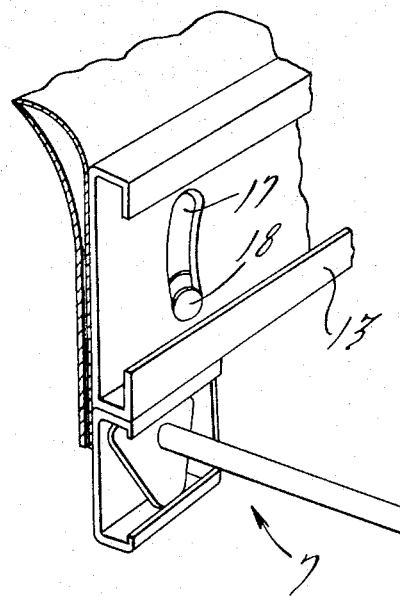

SAFETY SEAT WITH A SAFETY BELT, IN PARTICULAR FOR MOTOR VEHICLES

BACKGROUND OF THE INVENTION

Safety seats of this kind are already known in the form of the special sports seats offered by accessory dealers.

These known safety seats are often manufactured one of a kind for a specific racing vehicle or manufactured in small production runs for fitting as an accessory to higher powered production sports cars. This kind of manufacture makes it possible to design the seat and backrest frame as well as the method of supporting the backrest frame on the seat frame, and the attachment of the seat frame to the chassis in a correspondingly stable manner which will cope with the expected loadings. It goes without saying, therefore, that special sports seats of this kind are relatively elaborate in construction and manufacture, so that their cost is correspondingly high. Because of the development of special sports seats for competition use, facility for pivoting of the backrest into a position which facilitates entry to the rear seats, is generally not taken into account. Thus, safety seats of this kind are unsuitable for production sports cars which must have easy access to the rear seats.

The object of the invention is to create a safety seat with a safety belt, of the kind introductorily described, which is simpler and cheaper to manufacture and gives good access to the rear seats.

SUMMARY OF THE INVENTION

In accordance with the invention, this objective is achieved in that a production backrest frame is arranged to be pivotable forward vis-a-vis a production seat frame. This pivotable movement is in a conventional manner about a bottom pivot axis. The backrest pivots into a position which facilitates entry to the rear seats. The rake of the backrest is adjustable by pivoting the backrest about an upper pivot axis. Attachment points are provided on the seat frame at one or both sides, above the upper pivot axis and on the seat frame at the lower pivot axis, between which attachment points adjustable diagonal braces are arranged at one or both sides. The seat frame is provided at one or both sides with attachment points by which, through bolts, it is fixed to safety rails arranged at one or both sides parallel to the conventional fore-and-aft seat siderails. The safety rails are slidable in frictionless fashion in safety profiles or channels anchored to the bodywork, for example, to the transmission tunnel and the door sill. The bottom terminal points of a preferably three-point safety belt are attached to the safety rails and the top terminal point to the backrest frame. The safety rails engage in interlocking fashion in the safety profiles or channels when tilted as a consequence of high deceleration forces.

The safety rails will in this context preferably have a box section with flanges, and the safety profiles a channelled section opened laterally towards the seat.

The safety profiles are in this context, considering a vertically adjustable vehicle seat, attached directly to the vertical adjustment mechanism and pivotally linked through slotted holes and safety bolts, to the transmission tunnel and the door sill.

The top terminal point of the safety belt will preferably be constituted by an eye on the backrest frame in the neighborhood of the headrest, from which eye the belt runs downwards to a reel-in device attached to the safety rail.

The safety belt can in this context be arranged to be pivotable forward in the neighborhood of its top terminal point, through the medium of a lever arrangement located on the backrest frame, this in order to facilitate the application of the belt.

The lever arrangement can consist of a first lever fixed to the pivoting lever through a shaft, to the end of which first lever one end of a compression spring is attached whose other end engages a second lever pivotable by means of an electromagnet beyond the dead center position of the compression spring.

The invention provides a safety seat with a safety belt, in which the essential parts of an unreinforced production seat can be exploited and this achieves a considerable reduction in cost. The attachment points, provided in accordance with the invention on the components of the production seat, enable the latter to be very simply developed by the addition of a few reinforcing components to form a safety seat. It goes without saying that the modular principle employed here provides considerable advantages as regards production and as regards storage. A particular advantage of the invention resides in the fact that the conventional unreinforced seat guide rails can economically be employed for the functions of guiding and adjusting the seat, and the simple and robust safety rails in association with the safety profiles protect the guide rails against high loadings in the event of a high deceleration. The preferential arrangement, in accordance with the invention, of all the terminal points of the safety belt on the safety rails, achieves other production and assembly advantages.

DESCRIPTION OF THE DRAWINGS

The invention will be explained in more detail making reference to an example illustrated in the attached drawings.

FIG. 1 illustrates an oblique view of a safety seat with a safety belt in accordance with the invention, all the upholstery and trim parts having been omitted in order not to overburden the illustration.

FIG. 2 illustrates an enlarged view of the details comprised in the circle marked A in FIG. 1.

FIG. 3 illustrates an enlarged view of the details comprised in the circle marked B in FIG. 1.

FIG. 4 illustrates an enlarged view of the details comprised in the circle marked C in FIG. 1.

DETAILED DESCRIPTION OF THE INVENTION

A safety seat in accordance with the invention consists of an ordinary production seat frame 1 and a production backrest frame 2, which are connected together in the conventional way through a bottom pivot axis 3 which enables the backrest 2 to be pivoted into position which facilitates entry to the rear seats. The backrest frame 2 is furthermore provided with a pivot axis 4 by means of which its rake can be adjusted.

The production seat frame 1 is attached by conventional, production guide rails 5 extending in the fore-and-aft direction of the vehicle, so that the seat can be slid backwards and forwards, either directly to the floor stamping 6 of the body or indirectly through a mechanism 7 or seat height adjustment.

In accordance with the invention, attachment points are provided at one or both sides on the production backrest frame 2 above the top pivot axis 4, and at one or both sides of the production seat frame 1 at the location of the pivot axis 3, between which attachment points diagonal braces 8 which are adjustable at one or both sides are arranged.

The production seat frame 1 is furthermore provided at one or both sides with attachment points by which, through bolts 9, it can be secured to safety rails 10 arranged at one or both sides and extending parallel to the conventional seat guide rails 5. The safety rails 10 are slidable in substantially frictionless fashion in safety profiles or channels 13 likewise extending parallel to the seat guide rails 5 and anchored to the body, for example to the transmission tunnel 11 and the door sill 12.

The bottom terminal points 14 and 15 of a preferably three-point safety belt are here attached to the safety rails 10 and the top terminal point 16 to the backrest frame 2.

The arrangement of the safety rails 10 within the safety profiles or channels 13 is effected in accordance with the invention in such a fashion that with normal use of the vehicle seat, the safety rails 10 are slidable in substantially frictionless fashion in the U-section or channel section of the safety profiles 13. However, as soon as a high deceleration occurs so that the tensile forces acting at the top terminal points 16 of the safety belt where it engages the backrest frame 2 cause the entire seat to cant by elastic distortion of the conventional seat guide rails 5, the safety rails 10 engage in interlocking fashion with the safety profiles 13 and this locking effect is reinforced by the provision of locking tongues and locking openings.

The high overall seat loading occurring in the event of a collision can thus be transmitted safely to the vehicle body.

In the event of a vehicle seat which has height adjustment, the safety profiles 13 are attached directly to the height adjustment mechanism 7 and can follow the pivoting movements of said mechanism through the medium of slotted holes 17 cooperating with safety bolts 18 on the transmission tunnel and the door sill.

In the following, a number of advantageous details of the safety seat in accordance with the invention, with its seat belt, will be mentioned which substantially simplify the handling of the safety belt and thus contribute to ensuring that the belt is in fact used whenever the vehicle is driven.

For example, the top terminal point 16 of the safety belt can be formed by an eye on the backrest frame 2 in the neighborhood of the headrest, from which point the safety belt runs downwards to a reel-in device 19 attached to the safety rail 10. In this fashion, the wearing of a safety belt is made more attractive to the driver because of the facility for movement which the reel-in device gives.

Furthermore, in the neighborhood of its upper terminal point 16, the safety belt can be pivoted forward by means of a lever arrangement 20 carried on the backrest frame 2, in order to simplify the application of the belt. By this preliminary displacement of the belt section, in association with a bottom, upward-projecting lock section, easy one-handed operation of the safety belt is made possible.

The lever arrangement 20 as illustrated in detail in FIG. 3 consists here of a first lever 23 fixed by a shaft 22 to the pivoting lever 21, with the end of which first lever there engages the end of a compression spring 24 whose other end engages a second lever 25 which is pivotable past the dead center position of the compression spring 24 by means of an electromagnet 26.

The actuation of the pivoting lever 21 can be carried out as a function of various operations, e.g. opening and closing of the door, operation of the ignition key etc.

Self-evidently, the operation of the pivoting lever 21 can be carried out in the most varied ways. For example, it can be operated by rotary electromagnets, or d.c. motors, or for that matter by pneumatic or hydraulic piston or bellows arrangements.

Direct mechanical operation via the bowden cable secured at one end of the vehicle door and at the other end of the pivoting lever, as a function of the opening and closing movement of the door, is a particularly simple expedient.

We claim:

1. A safety seat with a three-point safety belt, in particular for motor vehicles,
   the seat having seat and backrest frames,
   pivot means supporting the backrest frame for rake adjustment about a pivot axis, and at least one adjustable diagonal brace extending between the seat frame and backrest frame controlling the rake adjustment,
   characterized in that a production backrest frame is constructed and arranged to be forwardly pivotable relative to a seat frame,
   the backrest frame being pivotally supported for swinging movement about a lower pivot axis into a position facilitating entry to the vehicle compartment to the rear thereof,
   the pivot means supporting the backrest frame for rake adjustment providing an upper pivot axis,
   the adjustable diagonal rake controlling brace being attached to the seat frame at the lower pivot axis and to the backrest above the upper pivot axis,
   the seat frame being provided on at least one side with attachment points receiving bolts,
   safety rails attached by the bolts to the seat frame,
   the safety rails being positioned in parallel relationship to fore and aft seat slide rails,
   safety profiles anchored to the vehicle body, i.e., the drive shaft tunnel and the door sill, receiving the safety rails,
   the safety rails have substantially frictionless contact with the safety profiles,
   the bottom terminal points of the three point safety belt being attached to the safety rails through the seat frame and the top terminal point to the backrest frame,
   and the safety rails engaging in interlocking fashion in the safety profiles when tilted as a consequence of high deceleration forces.

2. A safety seat as claimed in claim 1,
   characterized in that the safety rails have a box section with flanges and the safety profiles a channel section which is open laterally towards the seat.

3. A safety seat as claimed in claim 2,
   characterized in that the safety profiles are attached directly to a height adjustment mechanism in the event that the vehicle seat has height adjustment, and are pivotable through the medium of slotted holes on bolts attached to the transmission tunnel and the door sill.

4. A safety seat as claimed in claim 3,
characterized in that the upper terminal point of the safety belt is preferably constituted by an eye on the backrest frame in the neighborhood of the headrest, from which the safety belt extends downwards to a reel-in device secured to the safety rail.

5. A safety seat as claimed in claim 4,
characterized in that the safety belt can be pivoted forwards in the neighborhood of its top terminal point through the medium of a lever arrangement mounted on the backrest frame.

6. A safety seat as claimed in claim 5,
characterized in that the lever arrangement consists of a first lever connected by a shaft to the pivoting wheel,
to the end of which first lever one end of a compression spring is attached whose other end engages a second lever which can be pivoted past the dead center position of the compression spring by means of an electromagnet.

7. A safety seat as claimed in claim 1,
characterized in that the upper terminal point of the safety belt is preferably constituted by an eye on the backrest frame in the neighborhood of the headrest, from which the safety belt extends downwards to a reel-in device secured to the safety rail.

8. A safety seat as claimed in claim 7,
characterized in that the safety belt can be pivoted forwards in the neighborhood of its top terminal point through the medium of a lever arrangement mounted on the backrest frame.

9. A safety seat as claimed in claim 8,
characterized in that the lever arrangement consists of a first lever connected by a shaft to the pivoting wheel, to the end of which first lever one end of a compression spring is attached whose other end engages a second lever which can be pivoted past the dead center position of the compression spring by means of an electromagnet.

10. A safety seat as claimed in claim 1,
characterized in that the safety belt can be pivoted forwards in the neighborhood of its top terminal point through the medium of a lever arrangement mounted on the backrest frame.

11. A safety seat as claimed in claim 10,
characterized in that the lever arrangement consists of a first lever connected by a shaft to the pivoting wheel, to the end of which first lever one end of a compression spring is attached whose other end engages a second lever which can be pivoted past the dead center position of the compression spring by means of an electromagnet.

* * * * *